United States Patent

[11] 3,595,506

[72] Inventor Thomas B. Saunders
    St. Clair Shores, Mich.
[21] Appl. No. 791,959
[22] Filed Jan. 17, 1969
[45] Patented July 27, 1971
[73] Assignee Robin Products Company
    Warren, Mich.

[54] WIRE STRAP CONNECTOR
    12 Claims, 8 Drawing Figs.
[52] U.S. Cl. ..................................... 248/71,
    24/16, 248/74 PB
[51] Int. Cl. ..................................... F16l 3/14
[50] Field of Search .......................... 248/71, 73,
    74; 24/213 R, 16 PB, 208 A

[56] References Cited
    UNITED STATES PATENTS
    3,309,748  3/1967  Mortensen ............... 24/216
    2,937,834  5/1960  Orenick .................. 248/71
    2,995,328  8/1961  Whitted .................. 248/71
    3,118,644  1/1964  Wernig ................... 248/73
    3,144,695  8/1964  Budwig ................... 248/73 X
    3,169,004  2/1955  Rapata .................... 248/71
    3,465,992  9/1969  Schuplin .................. 248/71
    FOREIGN PATENTS
    546,770  8/1956  Italy ....................... 248/74

Primary Examiner—Chancellor E. Harris
Attorney—Settle, Batchelder and Oltman

ABSTRACT: A resilient fastener comprising an elongated strap having a hollow anchor member on one end thereof receivable through an aperture in a support with a locking member carried by the opposite end of the strap and receivable in the anchor member to lock the strap to the apertured support. The strap end supporting the locking member has a reduced area thickness surrounded by a reinforced thickness and spaced from the connection between the locking element and the strap so as to produce a diaphragm action between the locking element and the adjacent end of the strap allowing for relative movement of the strap on the apertured support while maintaining an integral connection.

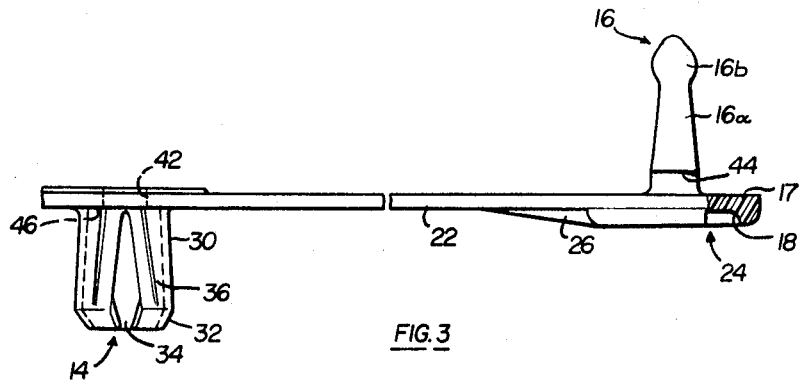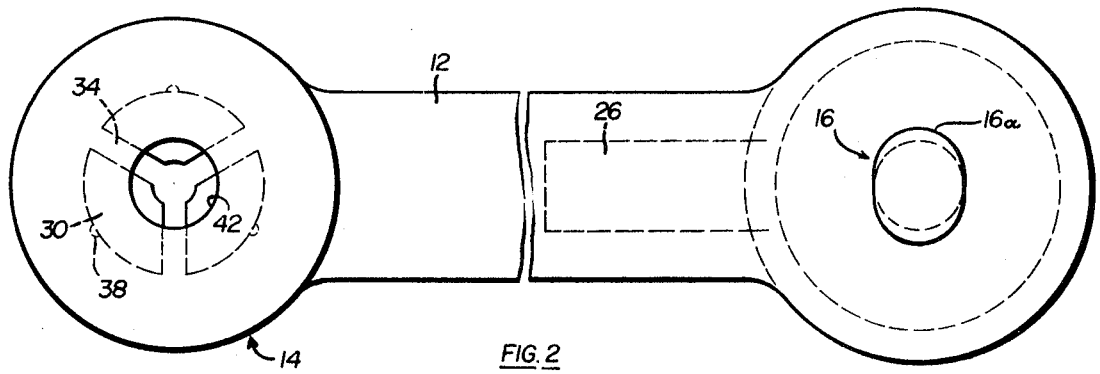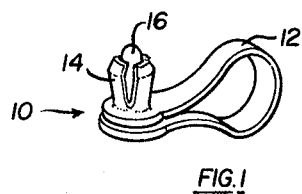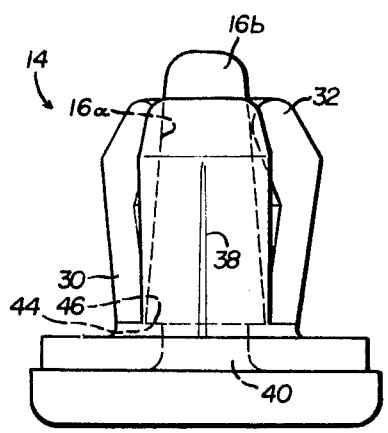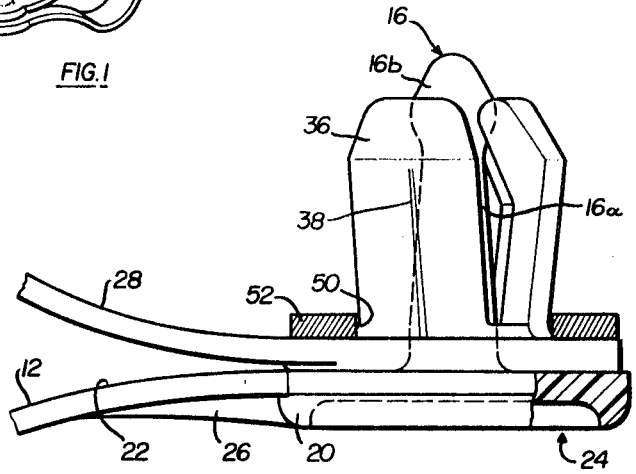

WIRE STRAP CONNECTOR

BACKGROUND OF THE INVENTION

The present invention relates generally to fasteners and more particularly to a one-piece fastener for securing one or more elongated members to an apertured support.

In the manufacture of automobiles and the like, wherein a large number of wires or cables are utilized, it is often necessary to secure one or more such wires or cables to a supporting panel. For example, the ignition wiring requires many electrical cables which must be brought to a central point and which must be properly supported. In such an installation, it is often necessary to secure one or more such wires at spaced intervals to a supporting structure.

Many devices have been utilized to secure such cables to supporting panels, the most common being the use of metal clips or metallic fasteners which are fixed to an aperture in a supporting panel.

Due to the corrosion and rust which normally accompanies metallic fasteners, plastic fasteners have recently become more acceptable since they not only eliminate the corrosion and rust problem but also can be utilized to automatically seal an aperture in a panel and will prevent rattling which normally accompanies metal fasteners secured to a metal panel.

While plastic or resilient fasteners of this type are generally known, such as for example the Orenick U.S. Pat. No. 2,937,834 and Budwig U.S. Pat. No. 3,144,695, such fasteners are still encumbered with problems. For example, the fasteners of the type disclosed in the above-mentioned Orenick et al. Patent, have been found to be objectionable since there is no capability of allowing for any relative movement between the fastening device and the strap once the fastener is in the installed condition. Thus, it has been found that all of the fasteners of this type result in premature failure at the connection between the strap end and the fastener element.

SUMMARY OF THE INVENTION

The fastener of the present invention includes an elongated strap having a locking member integral with one side at one end of the strap and an anchor member integral with the opposite side adjacent the opposite end of the strap. The strap has an area spaced from and surrounding the locking member connecting portion which is of greater thickness than said connecting portion to produce a diaphragm-type connection between the locking member or stud and the remainder of the strap.

The primary object of the present invention, therefore, is to provide a one-piece fastener for securing a member to an apertured support and in which the element supporting the member is capable of relative movement with respect to the support while maintaining a fixed connection between the element and the support.

Another object is to provide an improved fastener having a diaphragm-type connection between a strap and a locking element forming part of the fastener.

Other objects of this invention will appear in the following description and appended claims reference being had to the accompanying drawings forming a part of this specification wherein like reference characters designate corresponding parts in the several views.

DESCRIPTION OF DRAWINGS

FIG. 1 is a perspective view of the fastener constructed in accordance with the present invention and being shown in an assembled condition;

FIG. 2 is a plan view of the fastener of the present invention (prior to assembly);

FIG. 3 is a side elevational view of the fastener shown in FIG. 1 (prior to assembly);

FIG. 4 is an enlarged end view of the fastener shown in FIG. 1 and shown in the assembled condition;

FIG. 5 is an enlarged side elevational view of the fastener in an installed condition on a support;

DETAILED DESCRIPTION

Figure 6:
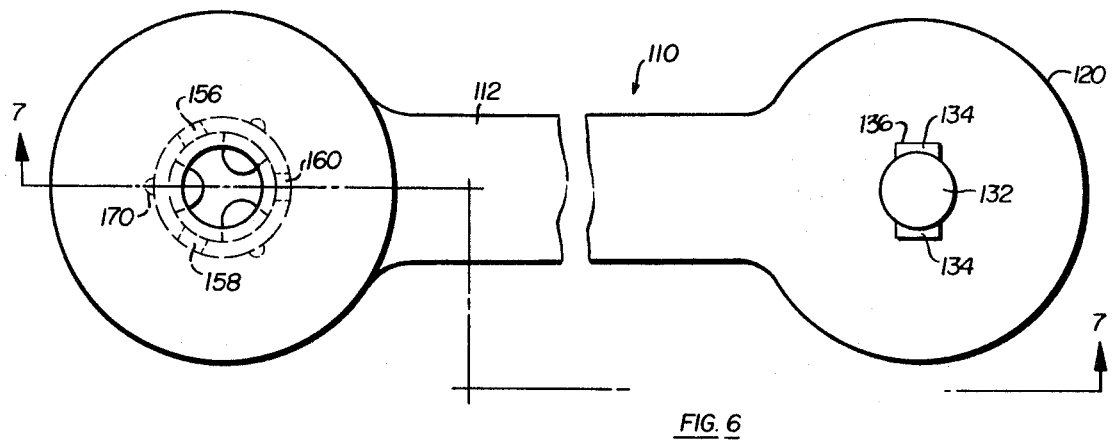
FIG. 6 is a plan view of a slightly modified embodiment of the invention.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIG. 1 of the drawings shown the fastener 10 of the present invention in its assembled condition. As shown in FIGS. 2 through 4, the fastener includes an elongates strap 12 having an anchor element or member 14 fixedly secured to one end of said strap on one surface thereof. The opposite end of the strap has a locking member or element 16 fixedly secured to an opposite surface thereof.

According to the primary aspect of the present invention, the connection between the locking element or stud 16 and the strap 12 includes means for allowing relative movement between the integral stud 16 and the strap 12 while maintaining a positive connection therebetween. For this this purpose, and as more clearly shown in FIG. 5, the end of the strap 12 has a reinforced member or rib 20 extending above the surface 22 of the strap and extends entirely around and is transversely spaced from the connection between the peripheral surface of the stud 16 and the strap 12. The reinforcing member 20 defines a diaphragm connection between the end of the strap and the stud. This is accomplished by the reduced area recess 24 defined between the inner wall of the substantially circular reinforcing rib 20.

Stated another way, the strap 12 has a connecting portion 17 which is of a first thickness and terminates at a peripheral or terminal edge 18 spaced from the connection of the peripheral surface of the stud 16. The reinforcing rib or head 20 encompasses the connecting portion 17 adjacent the peripheral edge.

The reinforcing means further includes a web 26 integral with a portion of the surface 22 of the strap 12 and a portion of the peripheral surface of the rib 20. This greatly increases the integrity of the connection between the strap 12 and the stud 16. Of course, the area below the recess 24 defined by the reinforcing rib 20 being of less thickness than the surrounding area defined by the rib will allow relative movement between the main body of the strap 12 and the stud 16. This flexing or relative movement which may be termed a diaphragm action has met with remarkable success since it allows some movement of the strap in the installed condition, shown in FIG. 5, while still maintaining a positive integral connection between the strap and the stud 16.

According to another aspect of the present invention, the stud 16 has an oval cross-sectional configuration having major and minor axes and which is of decreasing area to define a tapered oval body portion 16a extending away from the surface of the strap 12. The opposite free end of the stud 16 has members or bulbous portions 16b extending from the oval sides of the tapered portion 16a to define a substantially circular bulbous portion 16b on the free end of the stud, for a purpose which will become apparent hereinafter.

According to a further aspect of the present invention the anchor element 14, in its undeformed condition prior to receiving the stud 16, is a hollow body member comprising a substantially cylindrical portion 30 extending from the surface 28 with a tapered hollow portion 32 integral with the free end of the cylindrical hollow portion. The wall thickness of the tapered portion 32 is slightly greater than the thickness of the cylindrical portion 30 and terminates on the free end thereof to define a reduced area opening 34. The hollow body member further includes axially extending radially spaced slots 34 which extends substantially the entire length of the body member to divide the cylindrical portion 30 and the tapered portion 32 into segments 36.

The peripheral surface of the hollow member 30 further includes axially extending radially spaced ribs 38 which are located between the respective slots. These ribs increase the effective diameter of the anchor element to a diameter slightly greater then the diameter of the support aperture and are provided primarily for holding the anchor element in the support aperture prior to insertion of the locking element.

Means are also provided for interlocking the anchor element and the locking element in the assembled condition. Thus, as shown in FIG. 3, the interconnection between the stud 16 and the strap 12 includes a reduced area circular portion 40 having a diameter substantially equal to the length of the minor axis of the oval portion 16a. The diameter of the connecting portion 40 is substantially equal to the diameter of an opening 43 defined on the strap and concentric with the opening in the hollow cylindrical portion 30. The major dimension of the oval portion of the stud 16 thereby extends beyond the peripheral surface of the circular portion 40 to define substantially diametrically opposed shoulders 44. The shoulders 44 engage the parallel surface 46 defined between the opening 42 and the inside wall of the cylindrical hollow member or portion 30 to securely interlock or interconnect the two elements in the assembled condition shown in FIG. 4.

In the assembled condition shown in FIGS. 4 and 5, it will be seen that the bulbous portion 16b of the stud or locking element 16 lies between the terminal ends of the respective segments 36 and is of slightly greater diameter than the opening defined on the free end of the member 30. This results in a lateral movement of the free ends of the respective segments 36 so that the outer diameter of the peripheral surface of the segments at least at the point of interconnection between the cylindrical portion and the reduced tapered portion is substantially greater than the undeformed diameter of the cylindrical portion 30. The insertion of the stud will thereby securely lock the anchor element in an opening 50 defined on a support structure 52. Of course, the specific configuration of the anchoring element will allow the member to be fixedly secured in apertures or openings 50 of slightly different varying diameters and varying thicknesses of panels or supports 52.

The oval configuration of the stud or locking element considerably reduces the force necessary for insertion through the circular opening. This necessarily results from the fact that the portion surrounding the opening 42 need only be expanded along one axis during a major portion of the insertion rather than around the circumference of the opening as was heretofore necessary. Of course, the bulbous portion of the stud cooperates with the tapered portion of the anchor element to securely lock the fastener to the support.

Figure 8:
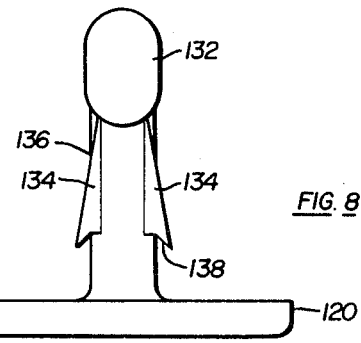
FIG. 8 is an end view of the locking end of the strap.
Figure 7:
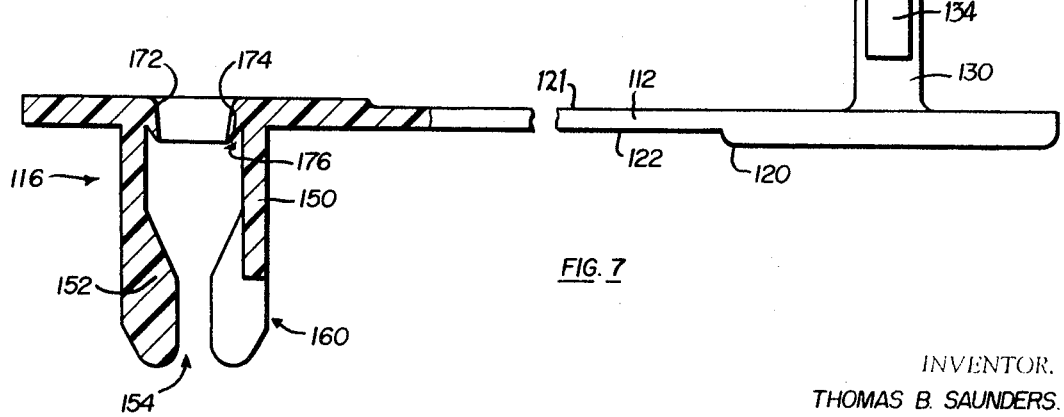
FIG. 7 is a sectional view taken along lines 7—7 of FIG. 6.

A slightly modified embodiment of the present invention is disclosed in FIGS. 6 through 8 which shows a strap 110 or fastener which is in many respects similar to the fastener disclosed in the embodiment of FIGS. 1 through 5. Thus, the fastener 110 includes an elongated strap 112 having an anchor element or member 114 fixedly secured to one end of the strap on one surface thereof. The opposite end of the strap has a locking member or element 116 fixedly secured to a surface opposite the surface to which the anchor member or element 114 is secured.

As in the embodiment of FIGS. 1 through 5, the end of the strap 112 having the locking element 114 secured thereto has a reinforcing member or rib 120 extending above a surface 122 which is opposite to the surface 121 to which the locking element is secured. The reinforcing member or rib 120 again defines a thickened area radially spaced from the contact point between the locking member and the strap so as to define a diaphragm connection between the end of the strap and the locking member or stud 114. It should be noted in the modified embodiment, the reinforcing web 26 has been eliminated since this web is not absolutely necessary in all operations.

According to the invention as expressed in the modified embodiment shown in FIGS. 5 through 8, the locking element is modified so as to further reduce the force necessary for insertion of the locking element through the circular opening defined in the anchoring element. For this purpose, the locking element 114 has a circular portion or shank 130 extending from the strap surface 121 and terminating in an enlarged portion 132 which has a diameter slightly greater than the diameter of the shank 130. The locking member or stud 114 further includes tapered fins or members 143 which are diametrically opposed and which have an outer surface 136 that is planar and extends substantially tangential to the peripheral surface of the shank 130. However, it it seen in FIG. 8 that the fins or ribs 134 in more particularly the surfaces 136 each taper outwardly and upwardly slightly from the axis of the shank so as to have a greater cross-sectional dimension at the upper free end thereof adjacent the surface 121 of the strap. As shown in FIG. 8 the upper free end thereof has a further inclined surface 138 which, combined with the surface 134, defines a locking projection, as will become apparent hereinafter.

According to a further aspect of the modified embodiment of the present invention, the locking element is also slightly modified so as to increase the retention capability of the fastener. Of course, the anchor element again includes a hollow cylindrical portion 150 and a tapered portion 152 integral with the free end of the hollow cylindrical portion which defines a reduced area opening 154 at the lower or free end thereof.

Again, the hollow member or anchor element has axially extending slots 156, 158 and 160 which are radially spaced substantially equally to divide the entire anchor element into a plurality of segments. However, an inspection of FIG. 7 shows that the slot 160 extends only through the major portion of the tapered member 152 and terminates a substantial distance below the surface 122 of the strap. Also, the slot 160 is located substantially along the main axis of the strap 112. This particular configuration and location of the slot greatly increases the retention capability of the strap fastener constructed in accordance with the present invention. Thus, experimentation has shown that, particularly when used in connection with thicker panels, retaining the upper portion of the two adjacent segments of the locking element which are located on opposite sides of the main axis of the strap as an integral unit requires that both of the segments located on opposite sides of the slot 160 must be moved substantially as a unit. Thus, it has been found that the fastener 110 constructed in accordance with the modified embodiment of the present invention has a greater average retention capability over a greater of variety of thicknesses of supporting panel.

Of course, the anchor member 116 again has the axially extending radially spaced ribs 170 which perform the same function as the ribs 38 in the embodiment of FIGS. 1 through 5.

Also, the opening 172 in the main strap 112 is again slightly smaller in diameter than the diameter of the hollow cylindrical portion 150 so as to define a locking shoulder on the surface 122 of the strap. However, it should be noted that in this instance the locking shoulder is in a form of a projection 174 which defines a recess 176 that is capable of receiving the projections defined by the surfaces 134 and 138 of the fins or ribs 134.

The assembly of the modified embodiment of the present invention is substantially identical to that described hereinabove in connection with the embodiment shown in FIGS. 1 through 5. However, it should be noted that the inclined camming surfaces 136 located at diametrically opposed points on the stud 114 will considerably reduce the necessary force required for inserting the locking element into the anchor element. Furthermore, the particular arrangement and construction of the particular elements again provides an automatic lock for interlocking the two elements once the stud has been fully inserted into the anchor element. Of course, in the modified embodiment, the entire assembly cannot readily be disassembled without complete destruction of at least the interlock connection between the anchor and locking elements.

Straps constructed in accordance with the present invention have been found to have considerably greater strength without fracture of the strap adjacent the area or connection between the strap and the stud or locking element. As was indicated hereinabove, heretofore the strap would necessarily tear away from the stud if any relative movement occurred between the strap and the support after it was in the installed condition.

While the reinforcing member has been shown to extend above the surface of the strap to which the stud is connected, it is readily apparent that the entire strap could be of increased thickness and only the connecting portion of reduced thickness.

I claim:

1. In combination with a panel having an aperture therein, a fastener comprising a substantially flat flexible strap having anchor and locking elements formed integral therewith adjacent opposite ends thereof and respectively received in said aperture with said locking element received in said anchor element for locking said strap to said panel, the improvement of said locking element comprising an integral member depending from one surface of said strap and reinforcing means defining an integral reinforcement on said strap provided by a circumferential flange extending above the surface of said strap and integral with said one surface substantially about the entire periphery thereof, surrounding and spaced from said integral member whereby an area of the strap between said reinforcing means and integral member defines a diaphragm allowing relative movement of said strap and said panel.

2. The combination as defined in claim 1, including the further improvement of said reinforcing means comprising a head extending above a surface of said strap to define a thickness greater than the thickness of the remainder of said strap.

3. The combination as defined in claim 2 including the further improvement of said reinforcing means including a web integral with at least a portion of said head and a portion of said strap.

4. The combination as defined in claim 1, including the further improvement of said anchor element comprising a hollow cylindrical portion extending substantially perpendicular from said strap and terminating in a free end spaced from said strap, a hollow tapered portion integral with the free end of said cylindrical portion and means defining slots in said portions into locking segments engaged by said locking element to lock said fastener to said support.

5. The combination as defined in claim 4, including the further improvement of said integral member extending substantially perpendicular to said surface and having a first portion adjacent said surface and a free end which is substantially oval in cross section and means on said free end defining a substantially circular locking portion engaging said locking segments.

6. The combination as defined in claim 1, including the further improvement of said locking element comprising a shank extending substantially perpendicular to said surface, means defining bulbous portion at the free end of said shank, and tapered fins extending from said bulbous portion toward said surface, said fins having camming surfaces engaging said anchor element during insertion of said locking element in said anchor element said camming surfaces terminating into projections adapted to lock said locking element to said anchor element.

7. The combination as defined in claim 1, including the further improvement of said anchor element comprising a hollow member extending from a surface opposite said surface of said strap, means defining slots extending from the free end of said hollow member toward the opposite surface to segment said hollow member with at least one of said slots terminating at a point spaced from said surface to maintain an integral connection between segments disposed on opposite sides of said at least one slot.

8. The combination as defined in claim 7, including the further improvement of said at least one slot being disposed substantially along a main axis of said strap and on a side adjacent the main body of said strap.

9. The combination as defined in claim 1, including the improvement of said locking element comprising an oval body portion extending away from said one surface and terminating in a free end, means defining a substantially circular portion on said free end of said body portion.

10. The combination as defined in claim 1, including the improvement of said locking element having diametrically opposed ribs on the peripheral surface thereof with tapered surfaces on said ribs extending toward said one surface and terminating adjacent said one surface to define locking edges.

11. A one-piece resilient fastener for securing an elongated segment to an apertured support, comprising an elongated strap having an anchor member at one end thereof integral with one side of said strap and a locking member at an opposite end of said strap integral with an opposite side of said strap, said locking member adapted to be received in said anchor member for securing said strap into the aperture of the support, the improvement of means defining an area portion surrounding the juncture between said strap and said locking element, said area portion having a terminal edge spaced axially transversely of the peripheral surface of said locking element, and reinforcing means integral with said strap defining a thickness axially of said locking element greater than the thickness of said area portion, integral with said area portion substantially about the entire periphery thereof and terminating adjacent said terminal edge whereby said area portion defines an integral flexible connection between said strap and said locking member.

12. A one-piece resilient fastener comprising an elongated strap having opposed sides and opposite ends, means defining a recess on one of said sides adjacent one end thereof, an elongated locking element integral with the other of said sides and extending outwardly therefrom with the cross-sectional area of said locking element being less than the cross-sectional area of said recess whereby said recessed area defines a portion of reduced thickness surrounded by at least a portion of greater thickness and said reduced thickness portion allows flexing between said strap and said locking element while maintaining an integral connection therebetween, said locking element comprising a shank extending from said other side, means defining tapered surfaces on opposed sides of said shank, said tapered surfaces having a progressively increasing dimension therebetween from the free end of said shank toward said other side and terminating spaced from said other side to define locking shoulders, and a hollow anchor element extending from said other side adjacent said opposite end, said hollow anchor element having enlarged members on the free end thereof defining separate locking elements adapted to be flexed relative to said hollow member to lock said fastener to an aperture support.